United States Patent [19]
Kawano

[11] Patent Number: 5,850,383
[45] Date of Patent: Dec. 15, 1998

[54] MAGNETO-OPTICAL RECORDING MEDIUM WITH RECORDABLE LANDS AND GROOVES

[75] Inventor: Toshifumi Kawano, Yokohama, Japan

[73] Assignee: Mitsubishi Chemical Corporation, Tokyo, Japan

[21] Appl. No.: 935,918

[22] Filed: Sep. 23, 1997

[30] Foreign Application Priority Data

Oct. 18, 1996 [JP] Japan .................................. 8-276294

[51] Int. Cl.$^6$ ............................................. G11B 7/24
[52] U.S. Cl. .................................. 369/275.4; 369/275.1
[58] Field of Search ........................ 369/275.4, 275.1, 369/275.3, 275.2, 13, 59, 112, 288, 58, 278, 279, 44.26, 277, 276

[56] References Cited

U.S. PATENT DOCUMENTS

| | | | |
|---|---|---|---|
| 5,581,539 | 12/1996 | Horie et al. | 369/275.4 |
| 5,602,825 | 2/1997 | Sugaya et al. | 369/275.4 |
| 5,694,379 | 12/1997 | Aratani et al. | 369/13 |
| 5,717,682 | 2/1998 | Nomoto | 369/275.4 |

OTHER PUBLICATIONS

Atsushi Fukumoto, et al., "Land/Groove Recording in Mo Systems," SPIE, vol. 2514, pp. 374–382.

Primary Examiner—Ali Neyzari
Attorney, Agent, or Firm—Oblon, Spivak, McClelland, Maier & Neustadt, P.C.

[57] ABSTRACT

A magneto-optical recording medium having a land/groove track formed on a transparent substrate, wherein the land and the groove of the land/groove track each has a substantially flat region, and recording is made on both the land and the groove, wherein at least an interference layer made of a dielectric and a magnetic layer made of a magnetic amorphous alloy of rare-earth metal and transition metal and having a thickness of at least 50 nm are formed, in this order, on the substrate, and relationships represented by the following formulas are satisfied:

$$0.5 \leq N - Nsub \leq 1.0$$

$$0.5 \leq d \times (N^2/\lambda)$$

$$d \times N/\lambda \leq 0.32$$

wherein Nsub is the refractive index of the substrate, N is the refractive index of the interference layer, d is the thickness (nm) of the interference layer, and $\lambda$ is the wavelength (nm) in air of a readout beam.

8 Claims, 4 Drawing Sheets

MAGNETO-OPTICAL RECORDING MEDIUM WITH RECORDABLE LANDS AND GROOVES

FIELD OF THE INVENTION

The present invention relates to a magneto-optical recording medium useful for information recording.

A magneto-optical recording medium has been developed for practical use as a rewritable high density information recording medium of low costs. Especially, a medium having a magnetic layer made of an amorphous alloy of rare-earth metal and transition metal, shows particularly excellent characteristics. The magneto-optical disk is a recording medium with a very large capacity. Nevertheless, a still larger capacity is desired along with an increase of the amount of information in the society.

The magneto-optical recording medium is usually provided with a spiral or concentrically circular land/groove track, and an optical pick up for recording and readout will receive a tracking servo signal from this track by a diffracted light. As a result, the optical pick up will scan on either the groove or the land of the land/groove track, and recording or readout is carried out along the track. The groove or the land for such recording and readout is called a recording track.

Heretofore, information recording is carried out on either the land or the groove, for a reason such that if recording is made on both the land and the groove, the respective recording marks tend to be mutually too close to each other, whereby accurate readout used to be impossible, for example, due to substantial leakage (cross talk) of groove signals during readout of land signals.

DESCRIPTION OF THE RELATED ART

However, in recent years, it has been found that by adjusting the groove depth to a proper level (i.e. substantially $\lambda/6$, where $\lambda$ is the wavelength of a readout beam), cross talk due to interference of light can be remarkably reduced, and it is possible to carry out recording and readout on both land and groove. By this technique, it is possible to increase the recording capacity twice as large with a conventional track pitch. Accordingly, this technique has attracted an attention as an effective means for accomplishing a large capacity. This system will be referred to as land/groove recording.

For example, it has been studied to apply land/groove recording to a magneto-optical disk of magnetic field modulation recording type by adjusting the groove depth to substantially $\lambda/6$ (SPIE Vol. 2514, pp. 374–382).

However, the ranges of conditions wherein the above mentioned effect for reducing cross talk of land/groove recording due to interference of light can be obtained sufficiently, are rather narrow, and such conditions are likely to be easily broken if birefringence of the substrate or ellipticity due to Kerr rotation in the magnetic layer occurs. For example, the groove depth for reducing cross talk from land during reading out on groove is likely to shift from the groove depth for reducing cross talk from groove during reading out on land, so that no group depth exists which satisfies both requirements.

To avoid such a situation, it is desired to reduce the birefringence of the substrate as far as possible and to bring Kerr ellipticity as close as possible to 0.

When linearly polarized light has entered a vertical magnetic recording medium, the reflected light will have a polarized light component perpendicular to the incident light, by a Kerr effect. If the phase of the component parallel to the incident light agrees to the phase of the component perpendicular to the incident light, the reflected light becomes linearly polarized light, and the Kerr ellipticity becomes 0. If the phase difference between the two components is large, the Kerr ellipticity becomes large.

In this specification, the Kerr ellipticity will hereinafter be represented by this phase difference $\Delta\phi$.

The birefringence of the substrate can be made very small depending upon the molding conditions. The question is the Kerr ellipticity. In a recording medium commonly employed, a first interference layer, a magnetic layer, a second interference layer and a reflective layer are provided on a substrate, and the magnetic layer is a thin layer of not more than about 30 nm. Accordingly, by properly adjusting the combination of the thicknesses of the respective layers, it is possible to bring the phase difference $\Delta\phi$ to substantially 0 by utilizing multiple interference of light in the multilayer.

For example, when the wavelength $\lambda$ of a readout beam is 780 nm, the Kerr ellipticity can be made substantially 0 if the first interference layer is made to have a thickness of 90 nm and a refractive index of 2.0 (such as silicon nitride), the magnetic layer is made of TbFeCo having a thickness of 25 nm, the second interference layer is made to have a thickness of 30 nm and a refractive index of 2.0 (such as silicon nitride), and the reflective layer is made of Al having a thickness of 50 nm.

Accordingly, with respect to a medium employing a conventional magnetic layer, there is no problem in principle in its application to the land/groove recording.

The present inventors have further attempted to combine this land/groove recording with a light intensity modulation direct overwritable (LIMDOW) magneto-optical recording medium or a magnetically induced super resolution (MSR) medium which is being practically developed in recent years. If such a combination is possible, it is possible to provide an additional value such as an overwriting function or further enlargement of the capacity by MSR, to the land/groove recording.

However, as the LIMDOW or MSR medium employs a multi-layer by exchange coupling, the thickness of the magnetic layer is usually as thick as more than 50 nm. In such a case, light will not substantially transmit through the magnetic layer, whereby the reduction of the Kerr ellipticity by the interference effect of such a multi-layer can not substantially be expected even when a reflective layer is provided.

Further, in a case where an interference layer is provided between a magnetic layer and a substrate in such a medium having a thick magnetic layer, the thickness of the interference layer has been selected so that the reflectivity would be minimum. By adjusting the reflectivity to be minimum, the utilization efficiency of the recording beam increases, and the recording sensitivity improves, and further, the noise decreases, whereby the SN ratio of the readout signal can be improved. However, such a thickness does not substantially contribute to reduction of the Kerr ellipticity.

In a conventional recording system wherein recording is carried out on either land or groove, Kerr ellipticity to some extent is not problematic. Namely, although Kerr ellipticity brings about a reduction of carrier, with a phase difference of at most 20 deg., the reduction of carrier gives no substantial influence to the properties.

However, in an application to land/groove recording, a phase difference exceeding 10 deg. is fatal from the viewpoint of the above mentioned increase of cross talk.

However, by conventional means, it is not possible to reduce the phase difference, and in such a state, an application to land/groove recording has been impossible.

In summary, in land/groove recording, it is essential to reduce the Kerr ellipticity to suppress cross talk. However, with a medium having a thick magnetic layer such as LIMDOW or MSR, it has been difficult to reduce the Kerr ellipticity, and it has accordingly been difficult to apply such a medium to land/groove recording.

SUMMARY OF THE INVENTION

The present invention is directed to optimize an interference layer between a substrate and a magnetic layer in a magneto-optical recording medium having a thick magnetic layer, to reduce the Kerr ellipticity and to make it possible to apply the medium to land/groove recording.

The present invention provides a magneto-optical recording medium having a land/groove track formed on a transparent substrate, wherein the land and the groove of the land/groove track each has a substantially flat region, and recording is made on both the land and the groove, wherein at least an interference layer made of a dielectric and a magnetic layer made of a magnetic amorphous alloy of rare-earth metal and transition metal and having a thickness of at least 50 nm are formed, in this order, on the substrate, and relationships represented by the following formulas are satisfied:

$$0.5 \leq N - N_{sub} \leq 1.0$$

$$0.5 \leq d \times (N^2/\lambda)$$

$$d \times N/\lambda \leq 0.32$$

wherein Nsub is the refractive index of the substrate, N is the refractive index of the interference layer, d is the thickness (nm) of the interference layer, and λ is the wavelength (nm) in air of a readout beam.

DESCRIPTION OF THE PREFERRED EMBODIMENT

Now, the present invention will be described in detail.

As described above, in land/groove recording, it is essential to adjust the absolute value of the phase difference Δφ to a level of at most 10 deg. in order to sufficiently reduce cross talk. Namely, $$|\Delta\phi| \leq 10 \text{ (deg.)} \tag{1}$$

more preferably, the absolute value of Δφ is at most 7 deg.

As mentioned above, in a LIMDOW medium or a MSR medium, the magnetic layer tends to be so thick that it will be impossible to reduce the Kerr ellipticity by the interference effect by means of a reflective layer.

As a result of an extensive study on a method for reducing the phase difference in such a case, the present inventors have found that the above formula 1 can be satisfied by setting the difference in refractive index between the substrate and the interference layer to a proper level and by employing a proper thickness which is different from the thickness of the interference layer which used to be employed to make the reflectivity to be minimum.

Qualitatively speaking, by the difference in refractive index between the substrate and the interference layer, and between the interference layer and the magnetic layer, multiple interference is properly created among these three layers to cancel out the phase difference formed in the magnetic layer.

Figure 1:
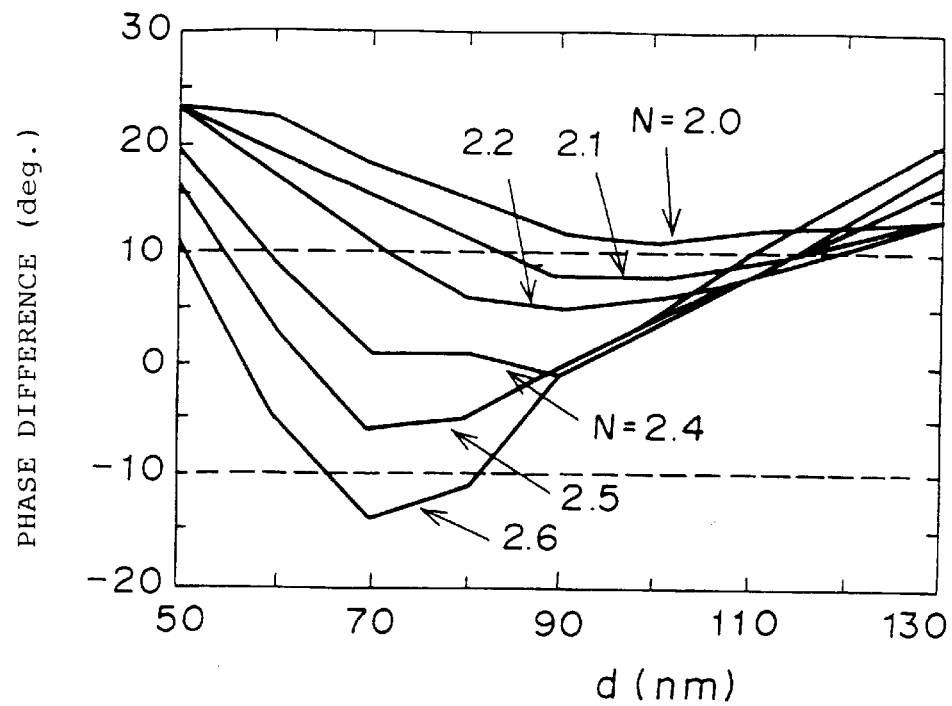
FIG. 1 is a graph showing the changes in the phase difference Δφ against the refractive index N and the thickness d of he interference layer in Example 1.

FIG. 1 is a graph showing an example of the changes in phase difference Δφ against the refractive index N and the thickness d of the interference layer. Here, the wavelength of the readout beam was 680 nm, and Nsub is constant at 1.58.

As the thickness d of the interference layer increases, Δφ decreases and after taking the minimum value at a certain thickness, it turns to increase.

As the refractive index N of the interference layer increases, the minimum value of Δφ decreases. Namely, as the difference (N−Nsub) between the refractive index Nsub of the substrate and the refractive index N of the interference layer increases, the minimum value of Δφ decreases.

As is evident from FIG. 1, if N−Nsub is too small, the minimum value of Δφ can not be at most 10 deg., and the above formula 1 can not be satisfied, and such can not be used for land/groove recording.

On the other hand, if N−Nsub is too large, the minimum value of Δφ will be too large in a negative direction, so that |Δφ| will inversely be large. In such a case, by properly selecting the thickness, the minimum value of Δφ can be made to be at most 10 deg., and the formula 1 can be satisfied. However, there will be no substantial margin in the thickness, and it will be practically difficult to form such a layer.

Accordingly, it is necessary to set N−Nsub so that the minimum value of Δφ will satisfy the formula 1.

Such a condition is represented by:

$$0.5 \leq N - N_{sub} \leq 1.0$$

more preferably, $$0.6 \leq N - N_{sub} \leq 0.9$$

most preferably, $$0.7 \leq N - N_{sub} \leq 0.9$$

As is apparent from FIG. 1, a preferred thickness of the interference layer is within a range where the formula 1 is satisfied in the vicinity of the minimum value of the phase difference.

As a result of a study, it has been found that the lower limit of the thickness of the interference layer is restricted by the phase difference and can be represented approximately by a function of $N^2$.

The reason for the function of $N^2$ is considered to be such that while the movement of the phase difference is governed by $d \times (N/\lambda)$ i.e. the optical thickness of the interference layer, the minimum value of the phase difference changes substantially as a linear function of $1/N$.

Namely, as shown in FIG. 1, the change in the phase difference in the vicinity of the phase difference being 10 deg., can be regarded approximately as a linear function of the thickness and can be represented by:

$$\Delta \phi = JNd/\lambda - K \ (1/N)$$

where J and K are constants. When $\Delta \phi = 10$ deg., $$JNd/\lambda = 10 + K \ (1/N)$$

Accordingly, $$d \times (N^2/\lambda) = (1/J) \ (10N + K)$$

However, K is substantially larger than 10N, whereby the right side can be regarded approximately as a value not dependent on N. Thus, the optimum thickness can be represented by $d \times (N^2/\lambda)$.

Namely, it is a thickness d which satisfies:

$$0.5 \leq d \times (N^2/\lambda) \quad (2)$$

A more preferred range is:

$$0.55 \leq d \times (N^2/\lambda)$$

The most preferred range is:

$$0.6 \leq d \times (N^2/\lambda)$$

On the other hand, it has been found that the upper limit of the thickness of the interference layer is restricted by the reflectivity. Namely, if the reflectivity is too high, the recording sensitivity or the SN ratio decreases. Accordingly, the reflectivity is required to be at most 35% (this value is the reflectivity from the layer surface and does not include reflection from the incident surface of the substrate).

The thickness of the interference layer satisfying this condition is represented by an optical thickness $d \times (N/\lambda)$ as follows:

$$d \times (N/\lambda) = 0.32 \quad (3)$$

More preferably, the reflectivity is at most 30%, and $$d \times (N/\lambda) = 0.28$$

Most preferably, $$d \times (N/\lambda) = 0.26$$

The present invention is particularly effective to obtain low cross talk with a medium having a magnetic layer as thick as at least 50 nm.

However, the phase difference $\Delta \phi$ is more or less influenced by the thickness d' (nm) of the magnetic layer. To reduce $\Delta \phi$, the thickness d' of the magnetic layer is preferably:

$$0.075 \leq d'/\lambda \leq 0.15 \quad (4)$$

more preferably, $$0.08 \leq d'/\lambda \leq 0.13$$

most preferably, $$0.09 \leq d'/\lambda \leq 0.12$$

For the preferred range of the thickness of the magnetic layer, the refractive index of the magnetic layer is not taken into account, since the refractive index of the magnetic layer does not substantially change, so long as an alloy of rare-earth metal and transition metal is employed.

It is conceivable that the interference layer is made of two or more layers having different refractive indices. In such a case, the refractive index N is defined by an average refractive index represented by $$N = (N1 d1 + N2 d2 + \ldots)/(d1 + d2 + \ldots)$$ where $N1, N2, \ldots$ are the refractive indices of the respective layers, and $d1, d2, \ldots$ are the thicknesses of the respective layers.

Further, the thickness d is defined by the total thickness of all the interference layers, as follows:

$d = d1 + d2 + \ldots$

Further, the wavelength $\lambda$ of a readout beam to be used in the present invention, is preferably at a level of from 630 to 800 nm. Usually, a wavelength of e.g. 780 nm, 680 nm or 630 nm is employed.

Now, the present invention will be described in further detail.

The substrate which is preferably employed in the present invention, is generally transparent to a recording and readout beam, such as a polycarbonate, PMMA, a polyolefin type plastic or glass. On the substrate, the above mentioned land/groove track for servo is formed, wherein each of the land and the groove of the land/groove track has a substantially flat region. To make the readout signals from the land and the groove to be substantially equal, the widths of the flat regions are preferably substantially equal. To effectively reduce cross talk, the boundary wall between the land and the groove is preferably generally vertical to the flat regions.

The groove depth is preferably in the vicinity of $\lambda/(6 \times \text{Nsub})$ where Nsub is the refractive index of the substrate, and $\lambda$ is the wavelength of the readout beam, whereby both the cross talk from land to groove and the cross talk from groove to land can be reduced, and land/groove recording will be possible. Specifically, the groove depth is preferably $\lambda/(6 \times \text{Nsub}) \pm 10\%$.

The distance between a land center to an adjacent land center (or the distance between a groove center to an adjacent groove center), i.e. the track pitch, is preferably as narrow as possible, for the purpose of high densitification. However, in view of a problem of cross talk or a readout signal level, the track pitch is preferably at least 1.7 times, more preferably at least 1.8 times, of the wavelength $\lambda$ of the readout beam.

The vertical birefringence of substrate is preferably at most $450 \times 10^{-6}$, more preferably at most $400 \times 10^{-6}$. The lateral birefringence of the substrate is the preferably at most $20 \times 10^{-6}$, more preferably at most $10 \times 10^{-6}$.

Further, the angle of the direction of the main axis of the lateral birefringence to the plane of polarization of incident light is preferably at most 10°.

The phase difference $\Delta \phi \text{sub}$ formed by the lateral birefringence of the substrate is preferably in a direction to cancel out the phase difference $\Delta \phi$ formed by the writing layer.

For example, when the substrate is made of a polycarbonate having a refractive index of 1.58, which is commonly used for optical disks, the range of the refractive index N of the interference layer will be at least 2.08 and at most 2.58 according to the formula (1).

As a material to satisfy this condition, a single substance of e.g. Si nitride, Al nitride, Si oxide, Si carbide, Ta oxide, ZnS or ZnSe, or a mixture thereof, is preferably employed. Among them, Si nitride, Si oxide, Ta oxide or ZnS is preferred.

It is particularly preferred to employ Si nitride wherein the nitrogen content is less than the stoicheometrical compositional ratio ($Si_3N_4$), whereby a high refractive index can be obtained. Namely, the nitrogen content is preferably at an atomic ratio of from 0.6 to 1.0 relative to 1 of Si.

To prepare such Si nitride, it is preferred to carry out reactive sputtering of a Si target in a gas mixture of an inert gas and nitrogen to form Si nitride on the substrate. The nitrogen content can be adjusted by adjusting the mixing ratio of nitrogen to the inert gas (usually Ar) or the pressure during the sputtering.

A preferred thickness of the interference layer is given by the formula (2) or (3).

For example, when the readout wavelength λ is 680 nm and the refractive index N of the interference layer is 2.4, the thickness d of the interference layer is from 59.0 to 94.4 nm.

The magnetic layer is made of an alloy of rare-earth metal and transition metal. The optimum condition of the present invention can not be established under such a condition where the readout beam transmits through the magnetic layer to cause multiple interference. Therefore, the thickness of the magnetic layer is required to be at least 50 nm. However, from the viewpoint of the recording sensitivity or the production cost, the thickness is preferably at most 300 nm.

The magnetic layer preferably has a plurality of layers so that functions other than land/groove recording can be imparted to the medium.

Specifically, it is preferably a magnetic layer having a function such as light intensity modulation direct overwrite (LIMDOW) or magnetically induced super resolution (MSR).

In the case of LIMDOW, the magnetic layer may, for example, have six layers of:

readout layer/memory layer/control layer/writing layer/switching layer/initializing layer.

In the case of MSR, the magnetic layer may, for example, have three layers of:

readout layer/switching layer/writing layer.

The overall thickness of the magnetic layer preferably satisfies the formula (4). For example, when the wavelength is 680 nm, the overall thickness is from 44.2 to 102.0 nm. However, as mentioned above, the overall thickness of the magnetic layer is required to be at least 50 nm.

To prevent oxidation of the magnetic layer, it is preferred to provide a protective layer made of a dielectric on the magnetic layer. As the protective layer, a dielectric such as Si nitride, Al nitride, Ta oxide or Si carbide, or a metal such as Ta, Mo, Zr, Al, Ag, Au or Pt, is preferably employed.

If the thickness of the protective layer is too thick, the productivity tends to be poor, and the recording sensitivity tends to be low. Accordingly, the thickness of the protective layer is from 20 to 80 nm, more preferably from 30 to 70 nm.

It is also possible to provide a metal layer via a dielectric layer or a dielectric layer via a metal layer. To provide a metal layer serves to provide a role as a heat dissipation layer, whereby it is possible to obtain an effect of improving the recording power margin.

It is preferred to form an organic protective layer in a thickness of a few μm on the protective layer by e.g. spin coating. To prevent mechanical scratching on the side of the substrate where no writing layer is present, a transparent hard coating may be applied.

A disk provided with these layers may be used alone, or two such disks may be used in a laminated state. The warpage of the disk is preferably at most 3 mrad at the maximum. More preferably it is at most 2.5 mrad.

To reduce the warpage, it is preferred to use two disks in a laminated state. Further, in the case of a plastic substrate, some warpage may be preliminarily imparted to the substrate so as to cancel out the stress of e.g. the interference layer, the writing layer or the protective layer.

Now, the present invention will be described in further detail with reference to Examples. However, it should be understood that the present invention is by no means restricted to such specific Examples.

EXAMPLE 1

A substrate was employed which had a thickness of 1.2 mm and a track pitch of 1.4 μm, wherein each of land and groove was constituted substantially by a flat area with a width of 0.7 μm, and the groove depth was 72 nm.

The substrate material was polycarbonate, and its refractive index was 1.58, its vertical birefringence was $395 \times 10^{-6}$, its lateral birefringence was $6 \times 10^{-6}$, and the angle of the main axis of lateral birefringence to the plane of polarization, was 4°.

This substrate was introduced into a sputtering apparatus, which was evacuated to a vacuum degree of at most $5 \times 10^{-5}$ Pa. Then, as an interference layer, Si nitride was formed on the substrate by reactive sputtering of a Si target in a gas mixture of Ar and nitrogen.

The refractive index N of the interference layer was changed to be 2.0, 2.1, 2.2, 2.4, 2.5 and 2.6, and the thickness d was changed from 50 nm to 130 nm. Adjustment of N was carried out by changing the mixing ratio of the nitrogen during the sputtering.

Then, as a magnetic layer, a readout layer of 25 nm made of $Gd_{23}(Fe_{80}Co_{20})_{77}$, a switching layer of 10 nm made of $Tb_{23}(Fe_{95}Co_5)_{77}$ and a writing layer of 30 nm made of $Tb_{23}(Fe_{75}Co_{25})_{77}$ were formed.

Finally, a protective layer of 50 nm made of Si Innitride was formed to obtain a disk. With respect to such disks, the phase difference and the reflectivity were measured and summarized in the Figures.

Figure 2:
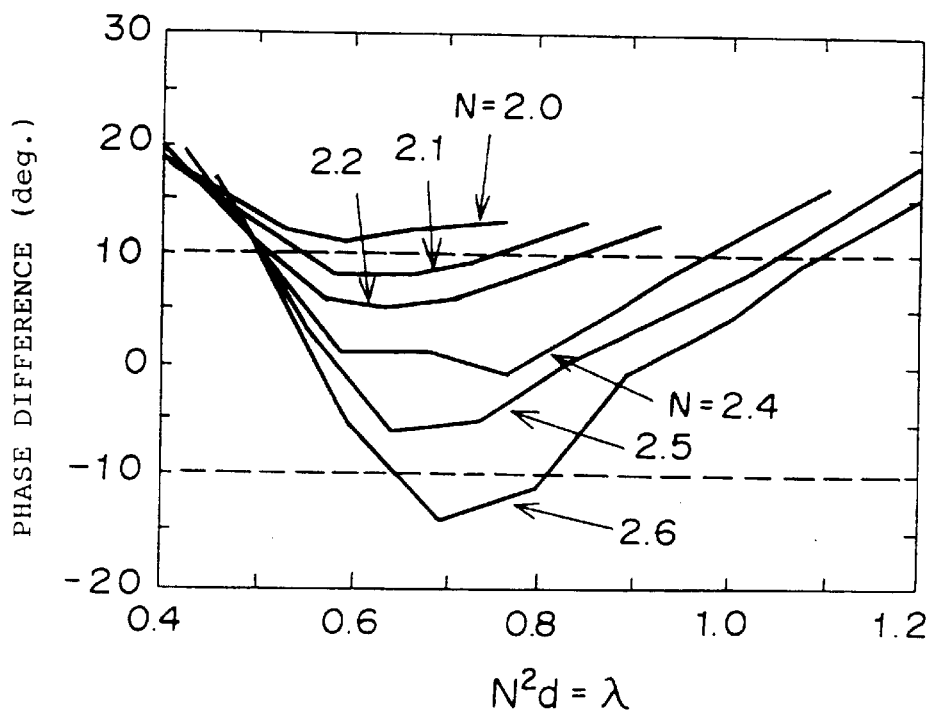
FIG. 2 is a graph showing the changes in the phase difference against the refractive index N and $N^2 d/\lambda$ of the interferenc layer in Example 1.
Figure 3:
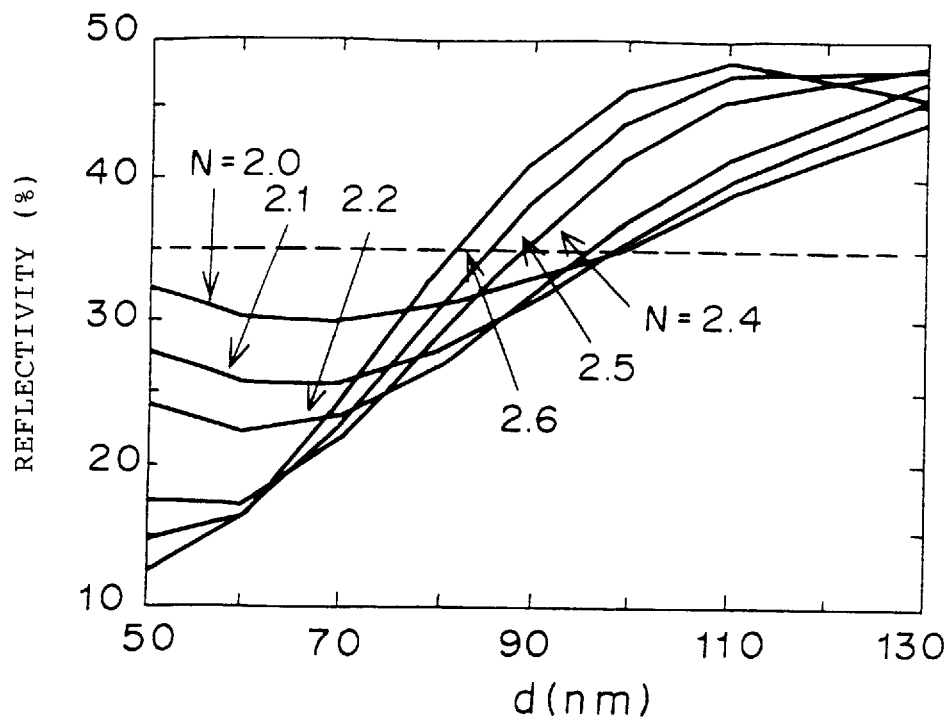
FIG. 3 is a graph showing the changes in reflectivity against the refractive index N and the thickness d of the interference layer in Example 1.
Figure 4:
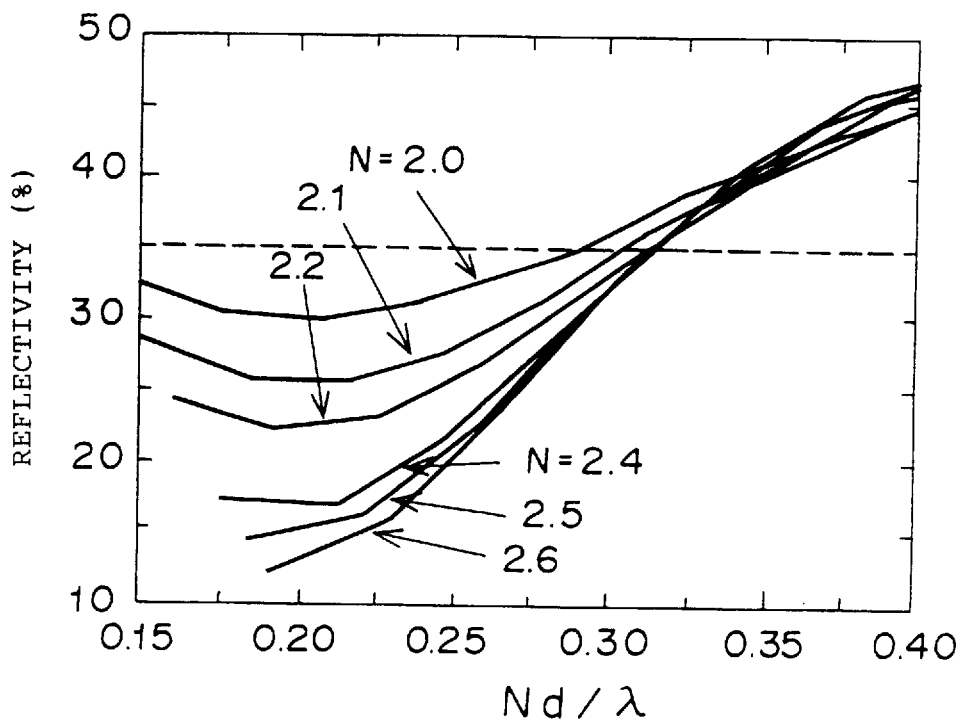
FIG. 4 is a graph showing the changes in reflectivity against the refractive index N and Nd/λ of the interference layer in Example 1.

FIG. 1 is a graph showing the change in the phase difference Δφ against the refractive index N and the thickness d of the interference layer. FIG. 2 is a graph showing this as a change in the phase difference Δφ against $N^2d/\lambda$. FIG. 3 is a graph showing the change in the reflectivity against the refractive index N and the thickness d of the interference layer. FIG. 4 is a graph showing this as a change in the reflectivity against Nd/λ.

A disk thus prepared was subjected to evaluation of CNR (a noise to signal ratio in a narrow zone) by light intensity modulation recording by means of an evaluation machine with a wavelength of 680 nm and a numerical aperture of 0.55. The recording conditions were such that the linear velocity was 7 m/s, the frequency was 9 MHz, the writing power was 9 mW, and the write pulse duty was 30%. The readout magnetic field Hr was 300 Oe. The readout power was 2.4 mW.

With this readout power, in all disks, a mask was formed at a high temperature portion of the readout spot, and super resolution readout was carried out.

Figure 5:
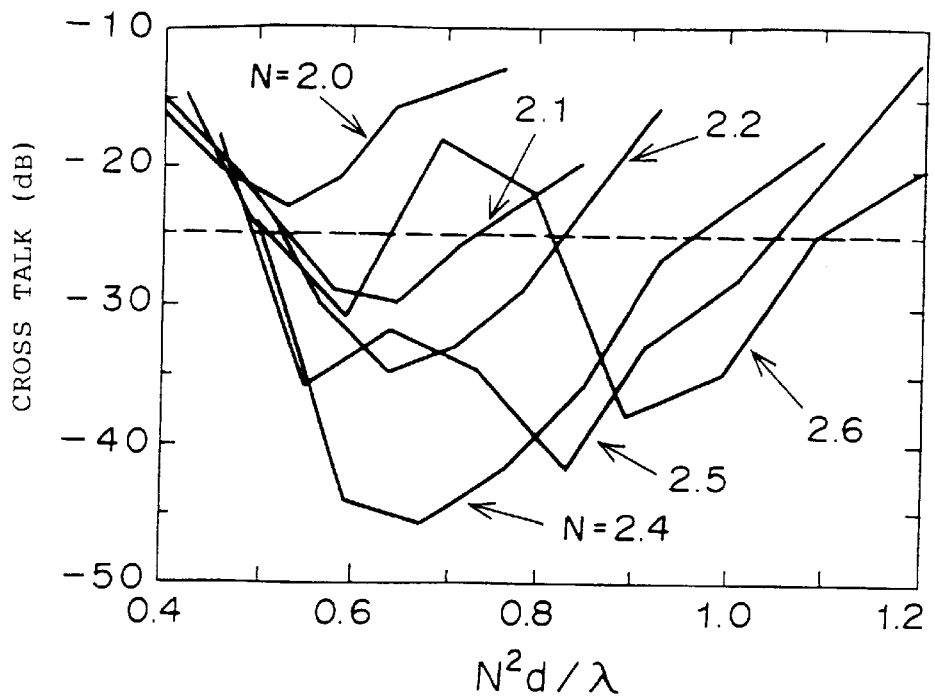
FIG. 5 is a graph showing the changes in cross talk against the refractive index N and $N^2 d/\lambda$ of the interference layer in Example 1.

Further, cross talk was measured during recording at a frequency of 2 MHz. The results are shown in FIG. 5, as the change of cross talk against $N^2d/\lambda$. As the cross talk, a larger value was adopted between the value measured at the adjacent groove when recording was made on land and the value measured at the adjacent land when recording was made on groove.

EXAMPLE 2

Disks were prepared under the same conditions as in Example 1 except that the refractive index N of the interference layer was changed to 2.4, the thickness d of the interference layer was changed to 80 nm, and the total thickness d' of the magnetic layer was changed by changing the thickness of the writing layer.

With respect to these disks, the phase difference and the reflectivity were measured and summarized in Figures.

Figure 6:
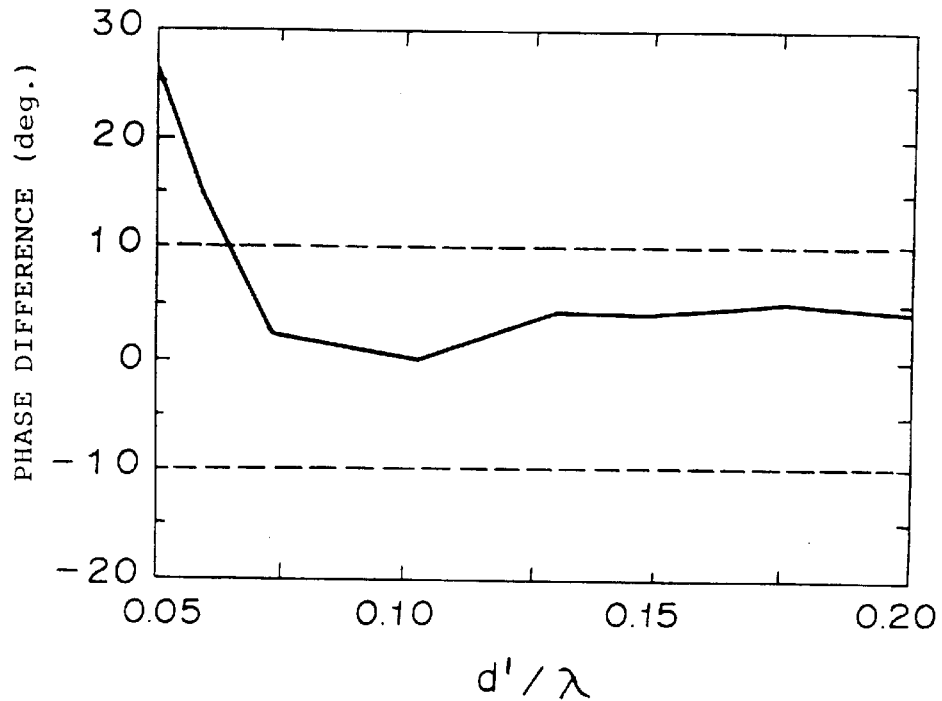
FIG. 6 is a graph showing the changes in the phase difference Δφ against d'/λ in Example 2.
Figure 7:
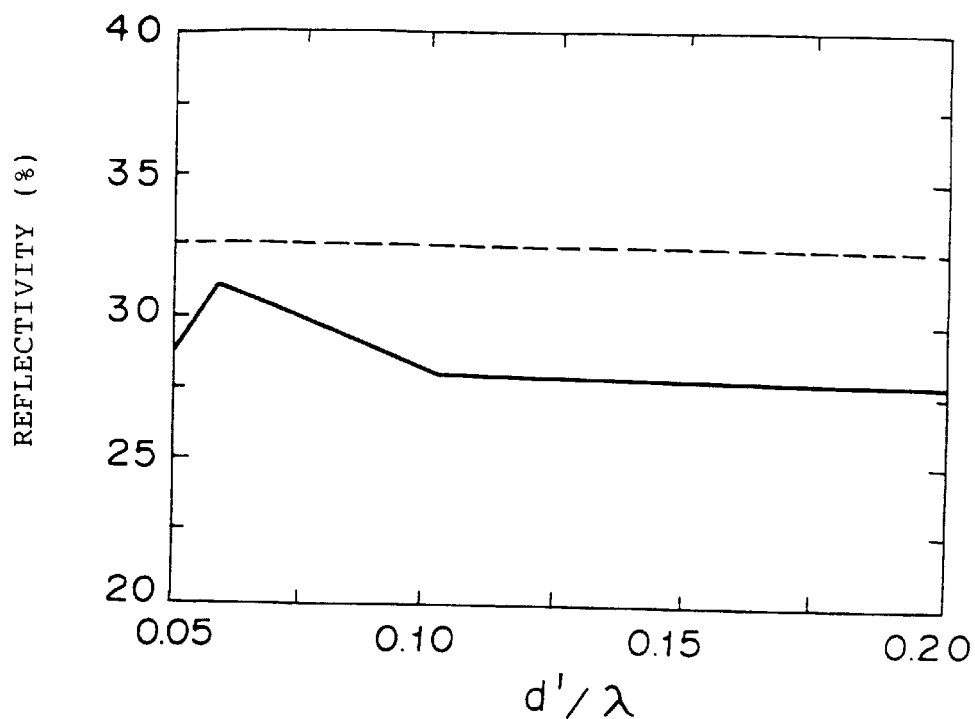
FIG. 7 is a graph showing the changes in reflectivity against d'/λ in Example 2.

FIG. 6 is a graph showing the change in phase difference $\Delta\phi$ against $d'/\lambda$, and FIG. 7 is a graph showing the change in reflectivity against $d'/\lambda$.

Figure 8:
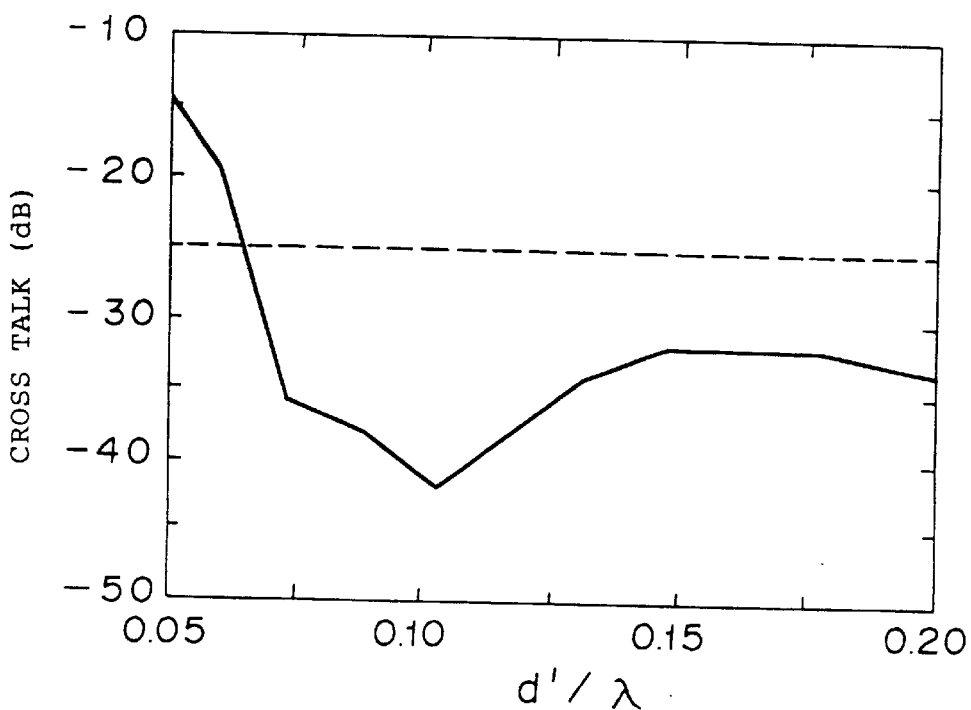
FIG. 8 is a view showing the changes in cross talk against d'/λ in Example 2.

Further, the cross talk was measured when recording was carried out at a frequency of 2 MHz. The measuring conditions were the same as in Example 1. The results are shown in FIG. 8, as the change of cross talk against $d'/\lambda$.

EXAMPLE 3

A substrate was used which had a thickness of 1.2 mm and a track pitch of 1.4 $\mu$m, wherein each of land and groove had a flat area with a width of 0.7 $\mu$m, and the groove depth was 72 nm.

The substrate material was a polycarbonate, the refractive index was 1.58, the vertical birefringence was $395\times10^{-6}$, the lateral birefringence was $6\times10^{-6}$, and the angle of the main axis of the lateral birefringence to the plane of polarization was 4°.

This substrate was introduced into a sputtering apparatus, which was evacuated to a vacuum degree of at most $5\times10^{-5}$Pa. Then, as an interference layer, Si nitride was formed on the substrate by reactive sputtering of a Si target in a gas mixture of Ar and nitrogen. The refractive index N of the interference layer was 2.4, and the thickness d of the interference layer was 80 nm.

Then, a readout layer of 10 nm made of $Gd_{23}(Fe_{90}Co_{10})_{77}$, a memory layer of 20 nm made of $Tb_{23}(Fe_{95}Co_5)_{77}$, a control layer of 10 nm made of $Gd_{30}(Fe_{92}Co_8)_{70}$, a writing layer of 30 nm made of $DY_{26}(Fe_{70}Co_{30})_{74}$, a switching layer of 10 nm made of $Tb_{20}(Fe_{97}Co_3)_{80}$ and an initializing layer of 20 nm made of $Tb_{26}(Fe_{30}Co_{70})_{74}$ were formed.

Then, a protective layer of 30 nm made of Si nitride was formed, and finally, a heat dissipation layer of 30 nm made of Al, was formed to obtain a disk.

The disk thus prepared was subjected to evaluation of CNR (the noise to signal ratio in a narrow zone) by light intensity modulation recording by means of an evaluating machine with a wavelength of 680 nm and a numerical aperture of 0.55.

The recording conditions were such that the linear velocity was 7 m/s, the frequency was 5 MHz, the writing power was a high power of 9 mW or a low power of 3.5 mW, and the write pulse duty was 30%. The readout power was 1.2 mW. A light intensity modulation direct overwrite operation was confirmed. The phase difference in this disk was +4 deg., the reflectivity was 26%, and the cross talk was -34 dB.

By using the magneto-optical recording medium of the present invention, excellent land/groove recording and readout will be possible even with a medium where a thick magnetic layer is essential, such as a magnetically induced super resolution medium or a light intensity modulation direct overwrite medium.

What is claimed is:

1. A magneto-optical recording medium having a land/groove track formed on a transparent substrate, wherein the land and the groove of the land/groove track each has a substantially flat region, and recording is made on both the land and the groove, wherein at least an interference layer made of a dielectric and a magnetic layer made of a magnetic amorphous alloy of rare-earth metal and transition metal and having a thickness of at least 50 nm are formed, in this order, on the substrate, and relationships represented by the following formulas are satisfied:

$$0.5 \leq N-Nsub \leq 1.0$$

$$0.5 \leq d\times(N^2/\lambda)$$

$$d\times N/\lambda \leq 0.32$$

wherein Nsub is the refractive index of the substrate, N is the refractive index of the interference layer, d is the thickness (nm) of the interference layer, and $\lambda$ is the wavelength (nm) in air of a readout beam.

2. The magneto-optical recording medium according to claim 1, wherein the thickness of the magnetic layer is at most 300 nm.

3. The magneto-optical recording medium according to claim 1, wherein the thickness d' of the magnetic layer satisfies a relationship represented by the following formula:

$$0.075 \leq d'/\lambda \leq 0.15$$

4. The magneto-optical recording medium according to claim 1, wherein the refractive index Nsub of the substrate and the refractive index N of the interference layer satisfy a relationship represented by the following formula:

$$0.6 \leq N-Nsub \leq 0.9$$

5. The magneto-optical recording medium according to claim 1, wherein the refractive index N of the interference layer, the thickness d (nm) of the interference layer and the wavelength $\lambda$ (nm) in air of the readout beam satisfy a relationship represented by the following formula:

$$0.55 \leq d\times(N^2/\lambda)$$

6. The magneto-optical recording medium according to claim 1, wherein the refractive index N of the interference layer, the thickness d (nm) of the interference layer and the wavelength $\lambda$ (nm) in air of the readout beam satisfy a relationship represented by the following formula:

$$d\times N/\lambda \leq 0.28$$

7. The magneto-optical recording medium according to claim 1, wherein the groove depth of the land/groove track is within a range of $\lambda/(6\times Nsub)\pm 10\%$, where Nsub is the refractive index of the substrate, and $\lambda$ is the wavelength (nm) in air of the readout beam.

8. The magneto-optical recording medium according to claim 1, wherein the track pitch of the land/groove track is at least 1.7 times of the wavelength in air of the readout beam.

* * * * *